United States Patent Office 3,180,721
Patented Apr. 27, 1965

3,180,721
SYNERGISTIC HERBICIDAL COMPOSITION AND METHOD
Edward D. Weil, Lewiston, N.Y., assignor to Hooker Chemical Corporation, Niagara Falls, N.Y., a corporation of New York
No Drawing. Filed Nov. 9, 1962, Ser. No. 236,678
13 Claims. (Cl. 71—2.3)

This invention relates to synergistic herbicidal compositions and to methods for their use in the control of weeds.

This application is a continuation-in-part of application Serial Number 856,949, which was filed on December 3, 1959, now U.S. Patent No. 3,063,821.

While effective herbicides are available which control most annual weeds, the control of perennial weeds continues to present a problem. The use of phytotoxic petroleum oils for herbicidal purposes, while saisfactory for the control of annual weeds, generally fails to give a satisfactory degree of control of perennial weeds, since their rapid regrowth occurs from the sub-surface parts which are undamaged by foliage treatment with the oil. Numerous additives have been proposed to be used in conjunction with petroleum oils, but generally have failed to provide the desired perennial weed control at economic levels.

It is therefore an object of this invention to make available compositions and method for their use which effectively control perennial weeds, as well as annual weeds.

Another object of this invention is to make such compositions and methods for the control of perennial weeds economically available.

Other objects and advantages of the present invention will become apparent from a consideration of the detailed specification which follows.

It is applicant's discovery that herbicidal compositions comprising hexachlorocyclopentenone which are useful against annual weeds are synergized to a high degree by the addition of polyhydric alcohol esters of trichloroacetic acid, and are made especially useful against perennial weeds.

Various proportions of such esters of trichloroacetic acid will produce the synergistic effect, but in practice it is preferred to add the other ingredients to a suitable solvent or diluent, such as an oily liquid medium at the rate of about one part by weight of hexachlorocyclopentenone to about one to about fifty parts by weight of the trichloroacetate ester. As the liquid medium, hydrocarbon oils are preferred and those derived from petroleum are considered to be best.

Esters of trichloroacetic acid suitable for use in this invention include the esters of ethylene glycol, propylene glycol, butylene glycol, glycerol, pentaerythritol, trimethylolethane, trimethylolpropane, and sorbitol. These are esters, mono-, di- and poly-, of trichloroacetic acid with lower aliphatic or alkylene glycols and polyols of about 2 to 6 carbon atoms and 2 to 6 hydroxyl groups. The preferred ester, however, for reasons of high activity and low cost, is the ethylene glycol diester of trichloroacetic acid, i.e., ethylene glycol bis(trichloroacetate).

The hexachlorocyclopentenone of the present compositions has two isomers with respect to the double bonded oxygen on either the 2-carbon or the 3-carbon atom. These two isomers or any mixture thereof may be used in the instant invention.

The carrier used in this invention may be any economically feasible oil of a "mineral" nature, such as kerosene, diesel oil, fuel oil, highly aromatic or naphthenic "weed oils," crude oil, or cracked highly unsaturated petroleum oils, and includes gas oils and those derived from coals. The proportion of oil employed in a formulation should be sufficient to dissolve the solids, and preferably is employed in a proportion of at least 0.2 gallon of oil per pound of trichloroacetate ester. The dilution of the herbicidal materials in the oil may be as great as will still produce a phytotoxic effect and will not usually be over 100 times the rates listed.

The compositions of this invention are preferably employed by applying them as sprays to the weed foliage to be destroyed or controlled. Of course, the foliage should be thoroughly wetted by the spray for best results. Minimum effective rates on a per acre basis for each component of the instant herbicides are about:

2 pounds of hexachlorocyclopentenone per acre
2 pounds of trichloroacetate ester per acre
0.5 gallon of petroleum oil per acre Greater proportions may be employed, if economically feasible.

In order that the present invention be readily understood, the following examples are given by way of illustration of a preferred embodiment thereof without intent to limit the invention to same. All parts are by weight unless otherwise indicated.

*Example 1*

A concentrate suitable for blending with a mineral oil for herbicidal use was prepared by admixing the following ingredients:

| | Parts |
|---|---|
| Hexachlorocyclopentenone | 1 |
| Ethylene glycol bis(trichloroacetate) | 2 |

The concentrate was non-inflammable and stable after one year's storage and is blendable with kerosene, diesel oil, or herbicidal "weed oil" before field use. The concentrate is useful because in some applications it is desirable to keep the solids separate from the carrier until shortly before use.

This concentrate may be blended with diesel oil to make a liquid spray containing 2 parts hexachlorocyclopentenone, 4 parts ethylene glycol bis(trichloroacetate) and 94 parts diesel oil, by weight. This spray will effectively eradicate established Johnson grass when applied to it at a rate of 100 gallons per acre.

*Example 2*

An area heavily infested with curled dock was divided into plots and treated with the following chemicals and combinations thereof at the various rates shown below. Four months later the percent weed control relative to adjacent and comparable untreated areas was evaluated with the following results.

| Chemical (in 50 gals. of diesel oil per acre): | Percent control |
|---|---|
| (1) Ethylene glycol bis(trichloroacetate)—20 lbs. | 20 |
| (2) Hexachloro-2-cyclopentenone—2.5 lbs. | 0 |
| (3) Ethylene glycol bis(trichloroacetate)—15 lbs. plus hexachloro-2-cyclopentenone—2.5 lbs. | 50 |
| (4) Ethylene glycol bis(trichloroacetate)—20 lbs. plus hexachloro-2-cyclopentenone—2.5 lbs. | 90 |

*Example 3*

A similar experiment was conducted on a heavy population of goldenrod with the following chemicals at the rates shown and evaluations were made after 30 days.

| Chemical(s) in 75 gals. of diesel oil (amount applied per acre): | Percent control |
|---|---|
| (1) Ethylene glycol bis(trichloroacetate)—15 lbs. | 30 |

(2) Hexachlorocyclopentenone)—5 lbs. _____ 10
(3) Ethylene glycol bis(trichloroacetate)—15 lbs.
  plus hexachlorocyclopentenone)—2.5 lbs. _ 90
(4) Ethylene glycol bis(trichloroacetate)—15 lbs.
  plus hexachlorocyclopentenone—5 lbs. ____ 90

*Example 4*

A similar experiment was conducted on an established stand of quackgrass and bluegrass with the following results which were evaluated after thirty days.

Chemical in 90 gals. of petroleum per acre: Percent control
(1) Ethylene glycol bis(trichloroacetate)—
  30 lbs. _____ 60
(2) Hexachlorocyclopentenone—2.5 lbs. _____ 0
(3) Ethylene glycol bis(trichloroacetate)—20 lbs.
  plus hexachlorocyclopentenone—2.5 lbs. _ 90
(4) Ethylene glycol bis(trichloroacetate)—30 lbs.
  plus hexachlorocyclopentenone—2.5 lbs. _ 100

Having described the invention and its attendant advantages what is claimed is:

1. A herbicidal composition comprising (a) hexachlorocyclopentenone and (b) an ester of trichloroacetic acid in which the esterifying group stems from a saturated lower aliphatic alcohol having a plurality of hydroxy substituents, the hexachlorocyclopentenone and ester of trichloroacetic acid being present in a phytotoxic amount.

2. A composition according to claim 1 in which the ratio of hexachlorocyclopentenone to ester is in the range of about 1:1 by weight to about 1:50 by weight.

3. A synergistic herbicidal composition comprising (a) hexachlorocyclopentenone, (b) an ester of trichloroacetic acid in which a saturated lower aliphatic alcohol having a plurality of hydroxy substituents is the source of the esterifying group, and (c) a hydrocarbon solvent oil for said hexachlorocyclopentenone and ester, said hexachlorocyclopentenone and ester of trichloroacetic acid being present in a phytotoxic amount.

4. A synergistic herbicidal composition comprising a phytotoxic proportion of a combination of (a) hexachlorocyclopentenone and (b) an ester of trichloroacetic acid in which the esterifying group stems from a saturated lower aliphatic alcohol having from 2 to 6 carbon atoms and from 2 to 6 hydroxy substituents.

5. A synergistic herbicidal composition comprising a phytotoxic proportion of a combination of (a) hexachlorocyclopentenone, (b) an alkylene diol ester of trichloroacetic acid, and (c) an organic solvent.

6. A synergistic herbicidal composition comprising a phytotoxic proportion of a combination of (a) hexachlorocyclopentenone, (b) a lower alkylene diol ester of trichloroacetic acid, and (c) a solvent quantity of a petroleum oil.

7. A composition according to claim 6 in which the hexachlorocyclopentenone and ester are present in the ratio between about 1:1 to about 1:50 parts by weight.

8. A synergistic herbicidal composition comprising (a) hexachlorocyclopentenone, (b) ethylene glycol bis(trichloroacetate), and (c) a solvent quantity of a petroleum oil, the hexachlorocyclopentenone and ethylene glycol isomer (trichloroacetate) being present in a phytotoxic amount.

9. A synergistic herbicidal composition according to claim 8 in which the ratio of hexachlorocyclopentenone to ethylene glycol bis(trichloroacetate) is in the range of about 1:1 by weight to about 1:50 by weight.

10. A method of controlling perennial weeds which comprises applying to the foliage of said weeds a phytotoxic amount of a mineral oil solution of (a) an ester of trichloroacetic acid in which the esterifying group stems from a saturated lower aliphatic alcohol having a plurality of hydroxy substituents, and (b) hexachlorocyclopentenone.

11. The method of claim 10 in which the ester is a trichloroacetic acid ester of an alkylene diol.

12. The method of claim 10 in which the ester of trichloroacetic acid is ethylene glycol bis(trichloroacetate).

13. The method of claim 10 in which combination of ester and hexachlorocyclopentenone is applied to the weeds as a petroleum oil solution at the rate of at least ½ gallon of oil per acre two pounds of ester per acre and two pounds of hexachlorocyclopentenone per acre.

References Cited by the Examiner

UNITED STATES PATENTS

| | | | |
|---|---|---|---|
| 2,588,997 | 3/52 | Towne et al. | 167—30 |
| 2,722,497 | 11/55 | Newcomer et al. | 167—30 |
| 3,063,821 | 11/62 | Weil | 71—2.3 |

FOREIGN PATENTS 530,249  9/56  Canada.

OTHER REFERENCES

Ahlgren et al.: Principles of Weed Control, John Wiley and Sons; New York, 1951, pages 68 and 69.

LEWIS GOTTS, *Primary Examiner.*

JULIAN S. LEVITT, *Examiner.*